C. F. JENKINS.
MOTION PICTURE DEVICE.
APPLICATION FILED APR. 29, 1916. RENEWED APR. 7, 1919.
1,411,359.
Patented Apr. 4, 1922.
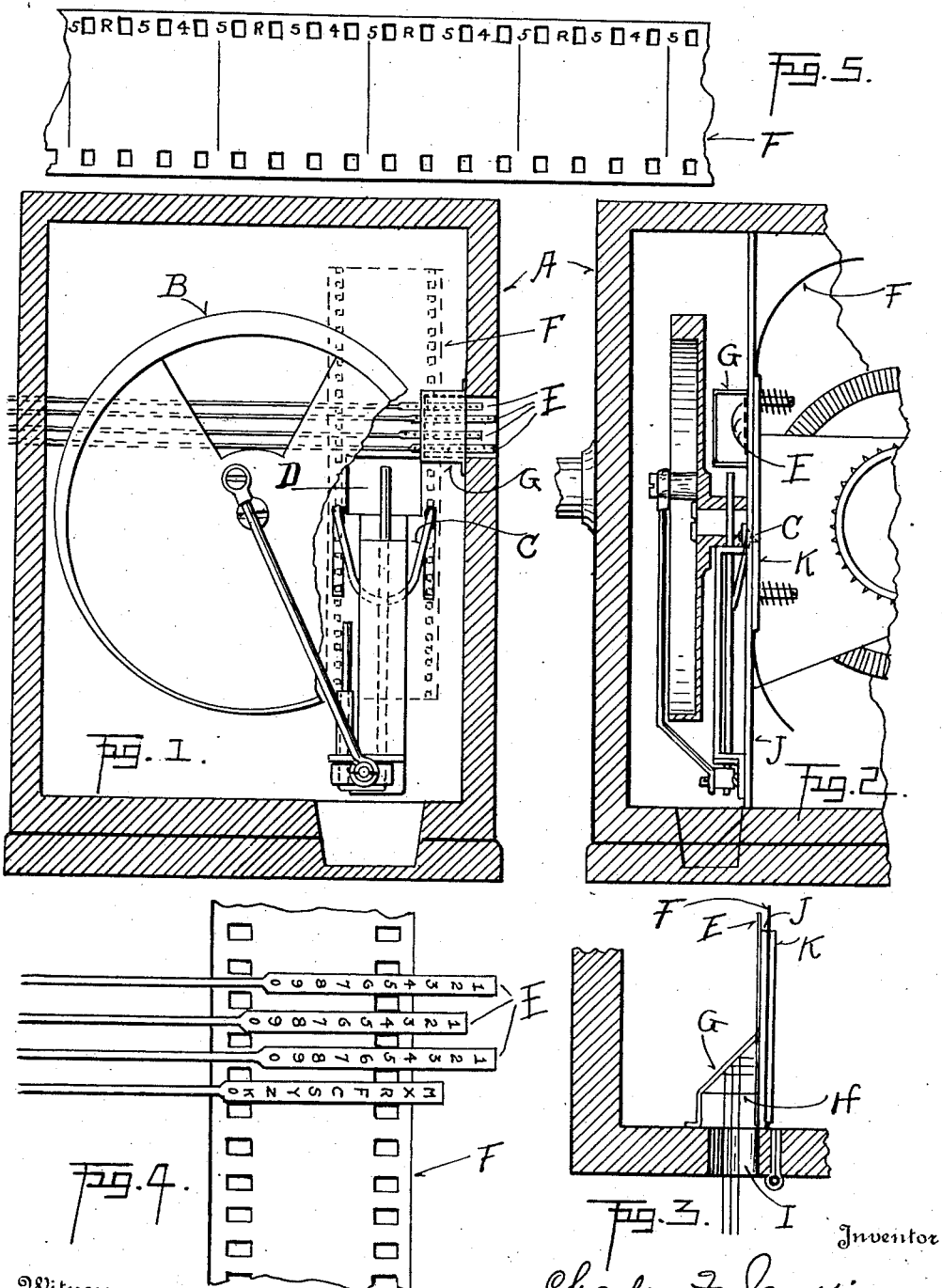

UNITED STATES PATENT OFFICE.

CHARLES FRANCIS JENKINS, OF WASHINGTON, DISTRICT OF COLUMBIA.

MOTION-PICTURE DEVICE.

1,411,359. Specification of Letters Patent. Patented Apr. 4, 1922.

Application filed April 29, 1916, Serial No. 94,396. Renewed April 7, 1919. Serial No. 288,218.

*To all whom it may concern:*

Be it known that I, CHARLES FRANCIS JENKINS, a citizen of the United States, residing at Washington, District of Columbia, have invented certain new and useful Improvements in Motion-Picture Devices, of which the following is a specification.

In the production of film for modern motion picture exhibitions, it is a common practice for directors, so far as may be practically possible, to save expense by photographing, regardless of their order in the complete film or "reel", scenes in which the most expensive artists appear, and separately photograph other scenes in which such artists are not required. This saving alone may amount to many thousands of dollars in each picture for some of the artists employed get as high as $10,000 per week, and as a number of companies are at work the year round making an average of a picture a week, it will readily be understood that the total saving amounts to millions of dollars annually.

Obviously each of the scenes thus made, out of its pictorial order, must be serially marked in some way in order that the valuable time of the high-priced director may not be required in the tedious process of putting together the proof-print which is run for the approval of the director, the scenario writer, and such others as have an interest in the picture before it goes out.

The most-generally accepted method is to write on a slate with chalk the number used in the original scenario to designate that particular scene, and such other characters as may be necessary to indicate to what particular picture-story it belongs, and then to hold this slate in front of the camera at the beginning, and often at the end of the scene photographed in order that these distinguishing marks may be photographed in the same negative film.

This enables the joiner-girls to make up a proof-print from the positive-prints made from these developed negative pieces, by following the type-written list of numbers representing the order in which the scenes are to appear in the completed picture.

This plan has a number of bad features the principal one being the fact that on occasions a marked end (cut off before the film is spliced to form the complete film or reel) is sometimes lost before the splicing is done. When this occurs the only person who can put the piece in its right place is the director who made the picture and nothing further can be done on the picture until he identifies the piece and determines its place in the picture, obviously an exasperating and expensive delay.

As this tab end is cut from the film section before the latter is put in its place in the complete film, it is not uncommon for the joiner to get the tab mixed with other waste scrap and to forget where the piece belongs. These discarded tab ends also represent additional waste and expense.

Even after the proof-print is made up and passed there is always the danger that it may not be correctly copied in duplicate prints because the joiners may get the scene out of order by reason of similarity of subject or setting. A very careful watch must therefore be maintained all the time to see that copies are put together exactly like the approved print.

The method is crude and unsatisfactory, exactly as though the collating of a printed book should be attempted by attention to the text and the pictures, no page numbers appearing thereon, and trusting to good fortune that the pages remain in their order until bound into a book.

The purpose of this invention is to mark the film at frequent intervals (like the numbering of book pages) in order that there shall be no hesitation in putting the film together in the exact order in which the several scenes should appear.

This is accomplished by marking the film, as it is exposed in the camera, with the serial number of each scene as designated in the scenario, the numerals and other distinguishing characters being properly set before the taking of each scene.

With these identifying marks in all the prints made from this negative, the veriest tyro can put the film together correctly and according to the list of numbers furnished for the purpose, and for the very simple reason that every foot of the film bears its own identifying characters which show, not only to what picture story it belongs, but at what place it should appear therein.

In the accompanying drawings, Figure 1 shows a front elevation, partly in section, of a camera having the device of the character suggested fitted thereto; Figure 2 a side elevation, partly in section; Figure 3 an enlarged sectional top view of a detail of the device; Figure 4 a further detail, and Figure 5 a view of one face of a film print having marks thereon as contemplated herein.

In these figures, A represents a camera casing; B the usual shutter therein; C film-feeding mechanism; D the picture aperture, where the lens impresses the picture image on the film; E thin, transparent strips bearing characters to be photographed on the margin of the film; F the film upon which the characters are to be photographed; G a light-reflecting box confining the light to the characters lying over that part of the film upon which they are to be photographed; H a prism which may be used if desired, to better reflect the light; I an aperture through which the light enters the reflecting box; J the "front-plate" or aperture plate of the camera; and K the tension plate which holds the film flat at the point of exposure.

The operation of the device is as follows: The scene having been set and the camera positioned to take it, the director calls the number of the scene to the photographer who then sets the several thin slides E in a corresponding order so that there will be photographed on the edge of the film the characters which are to identify the scene with the order in which it occurs in the scenario. After the scene is taken, and before the next one is made, the slides are again set for the second scene, and this is continued throughout the whole picture.

This is accomplished thus:—With the character strips set, as shown in enlarged view in Fig. 4, to photograph R545 (reading from the bottom upward, and standing for "retake 545" for example) the light, represented by the three thin lines, enters through the aperture I in Fig. 3 (a top view) and reflecting from the polished, sloping, inside wall of the box G impinges on the light-sensitive film lying between the front plate J and the tension plate K, and indicated by a heavy black line F, meantime carrying with it the image of the characters on the transparent strips E through which the light passes.

It is acknowledged that no means is shown for cutting off the light from the film during the movement of the film, but this does not prevent the operativeness of the scheme for the film moves suddenly and is required to be at rest perhaps half the time during each rotation of the shutter in order to get a proper exposure. For this reason it is thought unnecessary to show a shutter for interrupting the printing light.

When this exposed film is developed the characters thus photographed on the margin thereof also develop, and thus every foot of the film has its own identifying marks thereon. No matter, therefore, how the film is torn, cut, or misplaced, the picture to which it belongs and its place in the film can be always quickly and accurately determined.

I do not confine myself to the particular construction shown herewith, for it is obvious that other means may be employed for arranging identifying marks to be impressed on the film at the time the scene is photographed; and that the light used in this case may be directed by lens or otherwise, either before or after passing the movable characters, onto the margin of the film upon which the characters are to be impressed.

Nor is it necessary that these characters appear opposite each individual picture; it is quite as satisfactory if they appear at less frequent intervals along the edge of the film.

What I claim, therefore as my invention, is—

1. The method of economically securing properly arranged motion picture plays and the like which consists in producing, regardless of their final position in the play, parts in which certain players appear, automatically producing, photographically, at short intervals, upon each such part, simultaneously with the production of ordinary pictures thereon, indicia showing exactly the proper place of such part in the play, and subsequently uniting the parts accordingly.

2. For indicating on each section of motion picture film its specific place in the production of which it forms a part, the combination with a camera having the usual exposure opening and film feeding devices, of indicia overlying the marginal portion of the film and manually adjustable to form unchanging permutations and means for admitting a printing beam of light to the overlying indicia to repeat indefinitely upon the film while its pictures are being formed that permutation which designates the particular portion of the work.

3. The combination with a motion picture camera, of a series of indicia bearing strips longitudinally adjustable manually and adapted to lie between the marginal perforations of a film in close proximity thereto, and means for admitting a printing beam of light only to the indicia overlying the marginal portion of the film.

In testimony whereof I have affixed my signature.

CHARLES FRANCIS JENKINS.